United States Patent
Takabayashi et al.

(10) Patent No.: US 9,489,980 B2
(45) Date of Patent: Nov. 8, 2016

(54) VIDEO/AUDIO SYNCHRONIZATION APPARATUS AND VIDEO/AUDIO SYNCHRONIZATION METHOD

(71) Applicant: FUJITSU LIMITED, Kawasaki-shi, Kanagawa (JP)

(72) Inventors: Yosuke Takabayashi, Sagamihara (JP); Yasushi Umezaki, Kawasaki (JP); Yasuo Misuda, Inagi (JP); Shotaro Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/599,712

(22) Filed: Jan. 19, 2015

(65) Prior Publication Data

US 2015/0235668 A1 Aug. 20, 2015

(30) Foreign Application Priority Data

Feb. 20, 2014 (JP) .................. 2014-031024

(51) Int. Cl.
| | | |
|---|---|---|
| H04N 9/88 | (2006.01) | |
| H04N 5/94 | (2006.01) | |
| G11B 27/00 | (2006.01) | |
| G11B 27/30 | (2006.01) | |
| H04N 5/04 | (2006.01) | |
| H04N 21/43 | (2011.01) | |
| H04N 21/439 | (2011.01) | |

(52) U.S. Cl.
CPC ......... *G11B 27/007* (2013.01); *G11B 27/3027* (2013.01); *G11B 27/3081* (2013.01); *H04N 5/04* (2013.01); *H04N 21/4307* (2013.01); *H04N 21/439* (2013.01)

(58) Field of Classification Search
CPC ............ G11B 27/007; G11B 27/3027; G11B 27/3081; H04N 5/04; H04N 21/4307; H04N 21/439

USPC ....... 386/239, 263, 264, 326, 353, 354, 201, 386/202, 207
See application file for complete search history.

(56) References Cited

U.S. PATENT DOCUMENTS

2005/0019020 A1 1/2005 Sato et al.
2007/0245222 A1* 10/2007 Wang ...................... H04N 5/04
714/798

FOREIGN PATENT DOCUMENTS

| JP | 10-098681 | 4/1998 |
|---|---|---|
| JP | 2000-32397 A | 1/2000 |
| JP | 2003-189222 | 7/2003 |
| JP | 2003-204492 | 7/2003 |

OTHER PUBLICATIONS

Korean Office Action mailed Nov. 13, 2015 for corresponding Korean Patent Application No. 10-2015-0012650, with English Translation, 7 pages.

\* cited by examiner

*Primary Examiner* — Robert Chevalier
(74) *Attorney, Agent, or Firm* — Fujitsu Patent Center

(57) ABSTRACT

A video/audio synchronization apparatus includes: a decoder configured to decode a frame contained in encoded video data and determine playback time of the frame based on a first clock signal, and decode encoded audio data and determine playback time of an associated audio signal contained in the decoded audio data and to be played back simultaneously with the frame, based on a second clock signal different from the first clock signal; a silent period detector configured to detect a silent period from within the associated audio signal; and an audio timing adjuster configured to reduce a difference between the playback time of the frame and the playback time of the associated audio signal by skipping or repeating a silent period contained within a period of the associated audio signal.

9 Claims, 6 Drawing Sheets

VIDEO/AUDIO SYNCHRONIZATION APPARATUS AND VIDEO/AUDIO SYNCHRONIZATION METHOD

CROSS-REFERENCE TO RELATED APPLICATION

This application is based upon and claims the benefit of priority of prior Japanese Patent Application No. 2014-031024, filed on Feb. 20, 2014, the entire contents of which are incorporated herein by reference.

FIELD

The embodiments described herein are related to a video/audio synchronization apparatus and method for synchronizing video and audio data and to a computer program for video/audio synchronization.

BACKGROUND

In an apparatus for playing back content containing video and audio data, a displacement may occur between the playback time of the video data and the playback time of the audio data, for example, due to such factors as the difference between the transmission time of encoded video data and the transmission time of encoded audio data. To address this, there have been proposed techniques for synchronizing the video and audio data so that the playback time of the video data matches the playback time of the audio data (for example, refer to Japanese Laid-open Patent Publication No. 2003-204492).

SUMMARY

On the other hand, work on further increasing video resolution has been proceeding in recent years. For example, in the field of television broadcasting, commercial implementation of television broadcasting with higher resolution than full high-definition television, such as 4K resolution (3840 pixels horizontally and 2160 pixels vertically) and 8K resolution (7680 pixels horizontally and 4320 pixels vertically), is being planned.

In the case of such increased resolution video, the playback time displacement occurring between the video and audio data tends to become noticeable, since even the details of a moving object become visible.

In one embodiment, a video/audio synchronization apparatus is provided. The video/audio synchronization apparatus includes: a decoder configured to decode a frame contained in encoded video data and determine the playback time of the frame based on a first clock signal, and decode encoded audio data and determine the playback time of an associated audio signal contained in the decoded audio data and to be played back simultaneously with the frame, based on a second clock signal different from the first clock signal; a silent period detector configured to detect a silent period from within the associated audio signal; and an audio timing adjuster configured to reduce a difference between the playback time of the frame and the playback time of the associated audio signal by skipping or repeating the silent period contained within a period of the audio signal associated with the frame.

The object and advantages of the invention will be realized and attained by means of the elements and combinations particularly specified in the claims.

It is to be understood that both the foregoing general description and the following detailed description are exemplary and explanatory, and are not restrictive of the invention as claimed.

DESCRIPTION OF EMBODIMENTS

Figure 1:
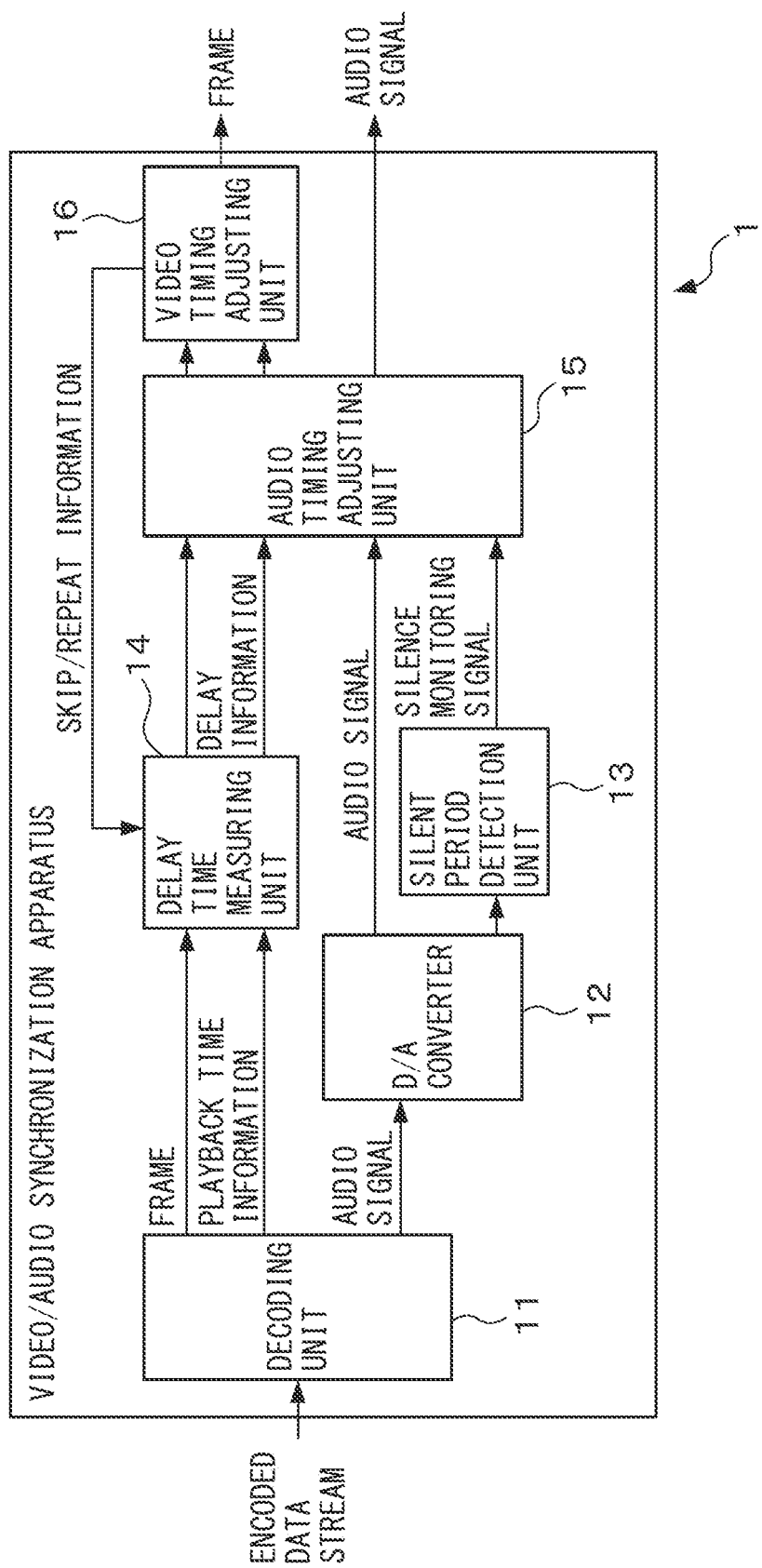
FIG. 1 is a diagram schematically illustrating the configuration of a video/audio synchronization apparatus according to one embodiment.

A video/audio synchronization apparatus according to one embodiment will be described below with reference to the drawings. A decoding apparatus which decodes encoded data streams containing encoded video data and encoded audio data refers to packet information and thereby determines the playback time of each frame contained in the video data and the playback time of each audio signal as an audio frame unit contained in the audio data. Depending on the design of the decoding apparatus, the clock signal used for synchronization when decoding the frame may differ from the synchronizing clock signal for the audio signal. For example, the decoding apparatus determines the playback time of each frame by referring to a clock signal supplied from a clock oscillator internal to the decoding apparatus or to a clock signal supplied from an external apparatus via a communication network. On the other hand, the decoding apparatus determines the playback time of the audio signal by referring to a clock signal decoded by using clock information, for example, Program Clock Reference (PCR), contained in the encoded data stream. In this case, if each frame and the audio signal are played back in accordance with presentation time information (Presentation Time Stamps: PTS) contained in the encoded video data and audio data, the playback time may become displaced between the video and audio.

To correct such a difference occurring between the playback time of each frame contained in the video data and the playback time of the audio signal to be played back simultaneously with the frame (for convenience of explanation, such an audio signal will hereinafter be referred to as the associated audio signal), the decoding apparatus may skip or repeat the frame. This is because skipping or repeating a frame in the video data is less noticeable to the viewer/listener than skipping or repeating a fraction of the audio signal.

However, the video is displayed on a frame-by-frame basis, and the interval between two successive frames is predetermined. For example, the frame interval is 33 msec in the case of interlaced scanning and 16 msec in the case of progressive scanning. Accordingly, when correcting the playback time displacement between the video and audio by skipping or repeating a frame, it is difficult to correct the playback time displacement within a time interval shorter than the frame interval.

On the other hand, in the case of the audio signal which is continuously played back, the decoding apparatus can correct the playback time displacement within a time interval shorter than the frame interval by skipping or repeating only a fraction of the audio signal.

In view of this, the video/audio synchronization apparatus detects from the audio signal a silent portion in which no sound perceivable by the viewer/listener is present, and repeats or skips the silent portion of the associated audio signal for each frame, thereby reducing the playback time displacement between the video and audio without giving any sense of unnaturalness to the viewer/listener.

FIG. 1 is a diagram schematically illustrating the configuration of the video/audio synchronization apparatus according to the one embodiment. The video/audio synchronization apparatus 1 includes a decoding unit 11, a digital/analog conversion unit 12, a silent period detection unit 13, a delay time measuring unit 14, an audio timing adjusting unit 15, and a video timing adjusting unit 16. These units constituting the video/audio synchronization apparatus 1 are implemented as separate circuits on the video/audio synchronization apparatus 1. Alternatively, these units constituting the video/audio synchronization apparatus 1 may be implemented on the video/audio synchronization apparatus 1 in the form of a single or a plurality of integrated circuits on which the circuits implementing the functions of the respective units are integrated. As a further alternative, these units constituting the video/audio synchronization apparatus 1 may be implemented as functional modules by executing a computer program on a processor incorporated in the video/audio synchronization apparatus 1.

The decoding unit (decoder) 11 extracts encoded video data and encoded audio data from encoded data streams and decodes the respective data in accordance with predetermined coding methods. The encoded data streams may be, for example, data streams that conform to the MPEG-2 TS format defined by the Moving Picture Experts Group (MPEG). The coding method for the video data may be, for example, MPEG-2, MPEG-4, H.264/MPEG-4 AVC, or H.265. On the other hand, the coding method for the audio data may be, for example, MPEG-2 Advanced Audio Coding (AAC), MPEG-4 ACC, or High-Efficiency Advanced Audio Coding (HE-ACC).

The decoding unit 11 determines the playback time of each frame of the decoded video data, based on a video clock signal. In the present embodiment, the decoding unit 11 decodes the System Time Clock (STC), based on the System Clock Reference (SCR) and on the clock signal supplied from the internal clock oscillator or the clock signal supplied from another apparatus. The STC provides the video clock signal. Then, when the value of the STC matches the value of the PTS of the decoded video data frame, the decoding unit 11 determines the value as representing the playback time of the frame. Thus, the decoding unit 11 outputs the frame at the determined playback time.

Further, the decoding unit 11 determines, based on an audio clock signal, the playback time of the audio signal contained in each decoded audio frame. In the present embodiment, when the audio clock signal obtained based on the STC and PCR matches the value of the PTS of the audio frame, the decoding unit 11 determines the value as representing the playback time of the audio signal contained in that audio frame. Then, the decoding unit 11 outputs the audio signal at the determined playback time. The SCR and PCR are contained in the encoded data stream. The decoding unit 11 supplies playback time information, such as the PTS of each frame, to the delay time measuring unit 14.

The digital/analog conversion unit 12 (hereinafter called the D/A conversion unit 12) converts the decoded audio signal from digital to analog form. Then, the D/A conversion unit 12 supplies the analog audio signal to the silent period detection unit 13 and the audio timing adjusting unit 15.

The silent period detection unit (silent period detector) 13 detects from within the analog audio signal a silent period in which no sound perceivable by the viewer/listener is present. In the present embodiment, the silent period detection unit 13 applies a filter to the audio signal to cut off the frequency components outside the human hearing range. Since the human hearing range is about 20 Hz to 20 kHz, a band-pass filter that allows the frequencies within the range of 20 Hz to 20 kHz to pass through and that cuts off any frequencies outside that range, for example, can be used as the filter.

The silent period detection unit 13 divides the filtered audio signal into a number of periods of predetermined length, and compares the strength of the audio signal in each period with a predetermined reference value. If the strength of the audio signal in the period is smaller than the predetermined reference value, the silent period detection unit 13 detects the period as being a silent period. The predetermined length can be set, for example, equal to the minimum value of the silent period during which skipping or repeating is performed in the audio timing adjusting unit 15 to be described later; more specifically, the predetermined length can be set to 1 msec to 10 msec which is shorter than the length of the frame interval (33 msec) of the video data. For convenience of explanation, the period of the predetermined length will hereinafter be referred to as the adjustment unit period.

The predetermined reference value may be set, for example, equal to the value of the lowest threshold of hearing ($10^{-12}/m^2$).

For each adjustment unit period, the silent period detection unit 13 supplies a silence monitoring signal to the audio timing adjusting unit 15 to indicate whether the period is a silent period or not.

The delay time measuring unit 14 measures a delay time representing the time difference between the playback time of the video data determined based on a first clock signal and the playback time of the audio signal data determined based on a second clock signal. A positive value of the delay time indicates that the playback time of the frame is earlier than the playback time of the audio signal data, and a negative value of the delay time indicates that the playback time of the frame is later than the playback time of the audio signal data.

If there are any frames skipped or repeated before the current frame in the video data, the delay time measuring unit 14 corrects the delay time in accordance with the number of skipped or repeated frames. For example, if there are a number, n, of frames (n is an integer not smaller than 1) skipped before the current frame, the playback time of the current frame becomes earlier by an amount of time corresponding to the number; therefore, the delay time measuring unit 14 adds a value equal to n×fp to the delay time, where fp denotes the frame interval period. On the other hand, if a number, m, of frames (m is an integer not smaller than 1) are repeated before the current frame, the playback time of the current frame is delayed by an amount of time corresponding to the number; therefore, the delay time measuring unit 14 subtracts a value equal to n×fp from the delay time.

The delay time measuring unit 14 supplies delay information representing the measured delay time to the audio timing adjusting unit 15 and the video timing adjusting unit 16.

For each frame contained in the video data, the audio timing adjusting unit 15 compares the absolute value of the delay time of the frame with a predetermined threshold value. The predetermined threshold value is a value corresponding to a period shorter than one frame interval of the video data. For example, the predetermined threshold value can be set to a value equal to the adjustment unit period or two to three times the adjustment unit period. If the absolute value of the delay time is equal to or greater than the predetermined threshold value, the audio timing adjusting unit 15 then determines whether there is a silent period in the audio signal associated with the frame. If there is a silent period, the audio timing adjusting unit 15 skips or repeats the silent period so as to bring the playback time of the audio signal closer to the playback time of the frame. For example, if the playback time of the current frame is earlier than the playback time of the associated audio signal by Δmsec, the audio timing adjusting unit 15 skips the silent period until the difference between the total length of the skipped silent period and Δmsec becomes shorter in length than a predetermined period or until there is no longer a silent period that can be skipped. Conversely, if the playback time of the current frame is later than the playback time of the associated audio signal by Δmsec, the audio timing adjusting unit 15 repeats the silent period until the difference between the total length of the repeated silent period and Δmsec becomes shorter in length than the predetermined period. The predetermined period can be set equal in length to the adjustment unit period or two to three times the adjustment unit period.

By skipping or repeating the silent period and thereby causing the delay time of each associated audio signal to follow the delay time of each corresponding frame contained in the video data, the difference between the playback time of the frame and the playback time of the associated audio signal is reduced to less than one frame interval. Since the silent period is a period in which no sound perceivable by the viewer/listener is present, unnatural sound noticeable to the viewer/listener does not occur, even if the silent period is skipped or repeated.

The audio timing adjusting unit (audio timing adjuster) 15 outputs the audio signal to a speaker (not depicted) after adjusting the playback time by skipping or repeating the silent period.

For each frame contained in the video data, the video timing adjusting unit 16 determines whether or not the absolute value of the delay time of the frame has become equal to or greater than the length of one frame interval. If the absolute value of the delay time of the frame has become equal to or greater than the length of one frame interval, the video timing adjusting unit 16 brings the delay time closer to 0 by skipping or repeating the frame.

For example, if the delay time of the current frame is positive and is not shorter in length than one frame interval, i.e., if the playback time of the current frame is earlier than a reference playback time by an amount equal to or greater than one frame interval, the video timing adjusting unit 16 repeats the current frame. On the other hand, if the delay time of the current frame is negative and is not shorter in length than one frame interval, i.e., if the playback time of the current frame is later than the reference playback time by an amount equal to or greater than one frame interval, the video timing adjusting unit 16 skips the current frame. By repeating or skipping the frame depending on the delay time, the video timing adjusting unit 16 can reduce the displacement of the playback time of each frame relative to the reference playback time to less than one frame interval. The reference playback time refers to the originally intended playback time of the frame. For example, the PTS defined in the encoded data stream for the associated audio signal to be played back simultaneously with the frame provides the reference playback time.

The video timing adjusting unit 16 presents each frame of the video data to a display circuit such as a video chip after adjusting the playback time through frame skipping or repeating. Further, each time a frame is skipped or repeated, the video timing adjusting unit 16 supplies the resulting skip/repeat information to the delay time measuring unit 14.

Figure 2:
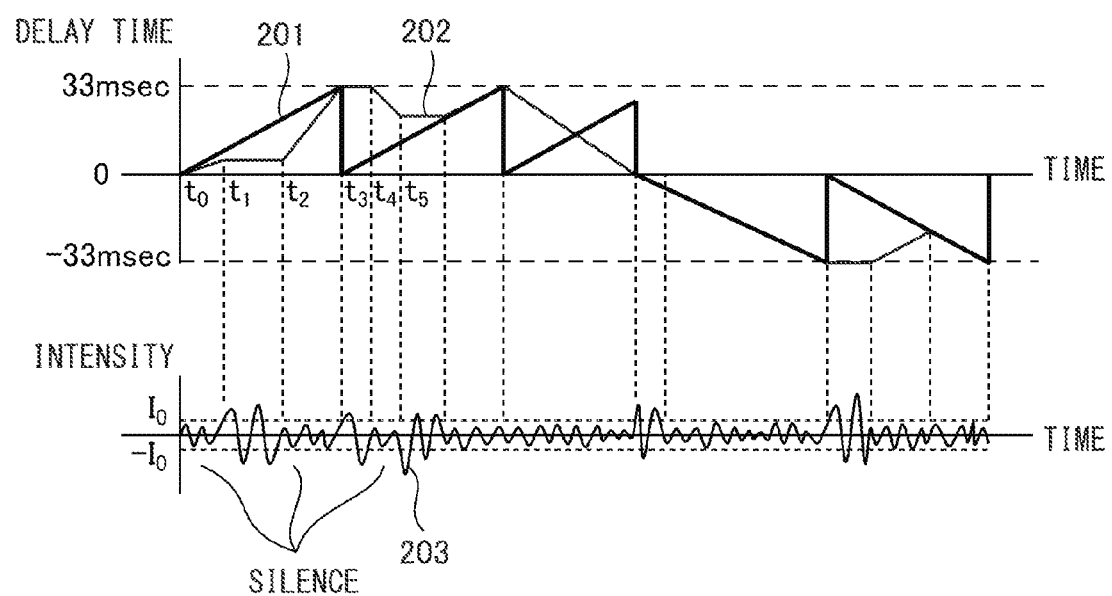
FIG. 2 is a timing chart illustrating one example of the relationship between the delay time of video data relative to a reference playback time, the delay time of an audio signal relative to a reference playback time, and the strength of the audio signal.

FIG. 2 is a timing chart illustrating one example of the relationship between the delay time of the video data relative to the reference playback time, the delay time of the audio signal relative to the reference playback time, and the strength of the audio signal. In FIG. 2, the abscissa represents the time. In the upper chart, the ordinate represents the delay time. When the delay time is above 0, the playback time of the video data frame is earlier than the reference playback time. On the other hand, when the delay time is below 0, the playback time of the video data frame is later than the reference playback time. In the lower chart, the ordinate represents the sound intensity. In the illustrated example, it is assumed that the frame interval of the video data is 33 msec.

When the delay time of the video data depicted by waveform 201 reaches +33 msec, one frame is repeated and the delay time is reset to 0. Conversely, when the delay time of the video data reaches −33 msec, one frame is skipped, and the delay time is likewise reset to 0. By contrast, the delay time of the audio data depicted by waveform 202 is brought closer to the delay time of the video data each time the silent period in the audio signal is skipped or repeated. The silent period is a period during which the sound intensity of the audio signal depicted by waveform 203 is smaller than a reference value $I_0$; for example, the period from time $t_0$ to $t_1$, the period from time $t_2$ to $t_3$, and the period from time $t_4$ to $t_5$ are the silent periods. In the period from $t_0$ to $t_3$, the silent period from $t_0$ to $t_1$ is skipped, because the playback time of the video data is earlier than the reference playback time. However, even when the silent period from $t_0$ to $t_1$ is skipped, the playback time of the video data is still earlier than the reference playback time; therefore, the silent period from $t_2$ to $t_3$ is also skipped. As a result, the delay time of the audio data becomes equal to the delay time of the video data at time $t_3$. However, since the delay time of the video data reaches 33 msec at time $t_3$, one frame of the video data is repeated, and the delay time is reduced to 0. As a result, the playback time of the audio data becomes earlier than the playback time of the video data. Therefore, the audio timing adjusting unit 15 repeats the silent period from $t_4$ to $t_5$ in order to reduce the difference between the delay time of the audio data and the delay time of the video data. Thereafter, the audio timing adjusting unit 15 repeats the same process and causes the delay time of the audio data to follow the delay time of the video data so that the difference between the delay time of the audio data and the delay time of the video data is reduced to less than one frame interval.

The video timing adjusting unit 16 may monitor the timing for the decoding unit 11 to complete the decoding of each frame. Then, when the decoding of the current frame of the video data is completed, the video timing adjusting unit 16 may reduce the delay time of the video data by skipping or repeating the current frame. In this case, it is preferable that the audio signal associated with the current frame contains a silent period long enough that the delay time of the audio signal can also be reduced to 0.

Figure 3:
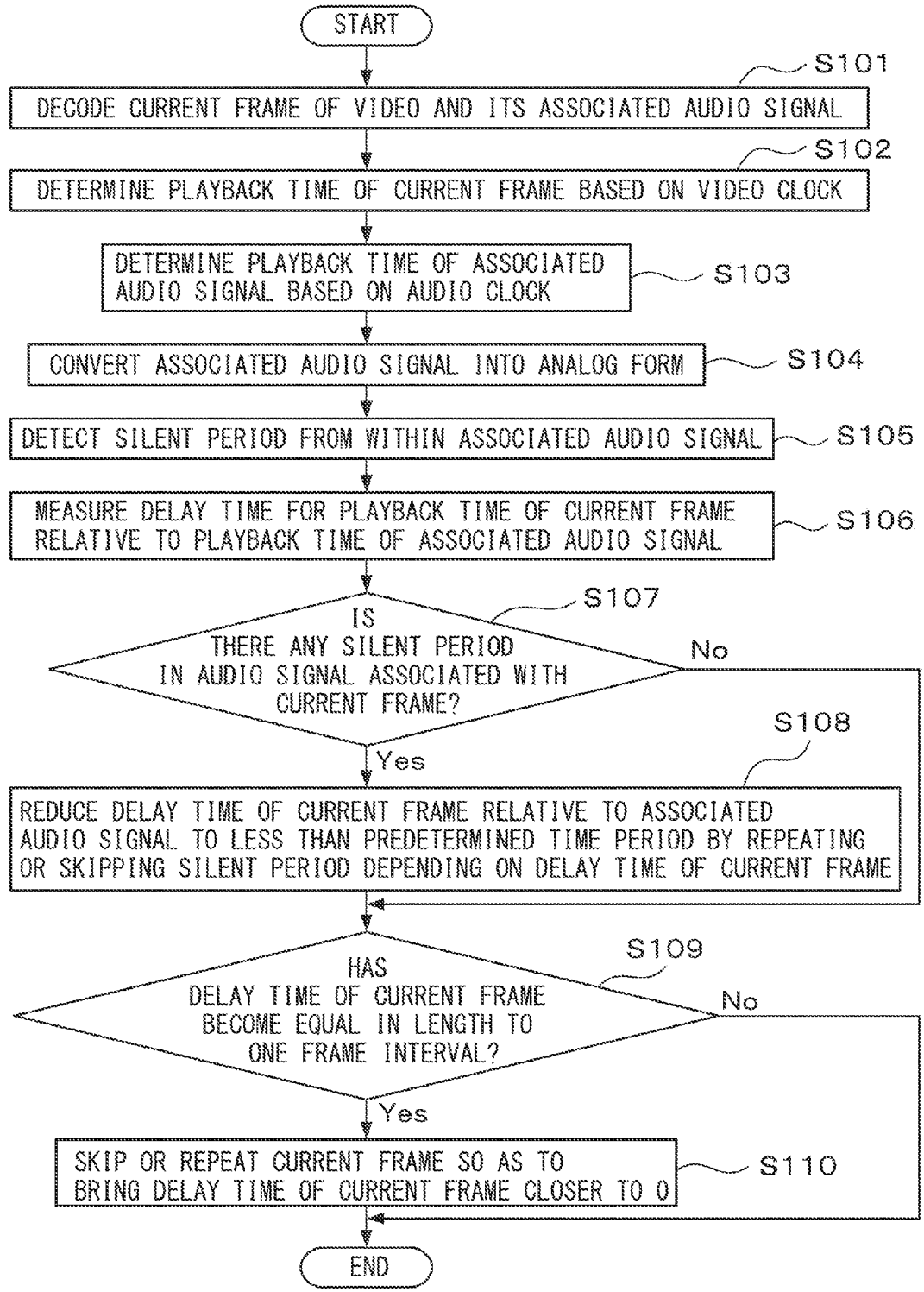
FIG. 3 is an operation flowchart of a video/audio synchronization process.

FIG. 3 is an operation flowchart of a video/audio synchronization process according to the present embodiment. The video/audio synchronization apparatus 1 repeats the following process for each frame of the video data.

The decoding unit 11 decodes the current frame of the video data and its associated audio signal (step S101). Then, based on the video clock signal, the decoding unit 11 determines the playback time of the current frame (step S102). Further, based on the audio clock signal, the decoding unit 11 determines the playback time of the associated audio signal (step S103).

The D/A conversion unit 12 converts the associated audio signal into analog form (step S104). Then, the silent period detection unit 13 detects a silent period from within the associated audio signal converted into analog form (step S105).

The delay time measuring unit 14 measures the delay time for the playback time of the current frame relative to the playback time of the associated audio signal (step S106).

The audio timing adjusting unit 15 determines whether there is a silent period in the audio signal associated with the current frame (step S107). If there is a silent period (Yes in step S107), the audio timing adjusting unit 15 can bring the playback time of the associated audio signal to the playback time of the corresponding frame of the video data by using the silent period. Therefore, the audio timing adjusting unit 15 skips or repeats the silent period so as to reduce the delay time of the current frame relative to the associated audio signal (step S108).

On the other hand, if there is no silent period (No in step S107), the audio timing adjusting unit 15 does not adjust the playback time of the associated audio signal.

The video timing adjusting unit 16 determines whether the delay time of the current frame has become equal in length to one frame interval (step S109). If the delay time of the current frame has become equal in length to one frame interval (Yes in step S109), the current frame is skipped or repeated so as to bring the delay time closer to 0 (step S110).

After step S110, or if the delay time of the current frame is shorter in length than one frame interval (No in step S109), the video/audio synchronization apparatus 1 terminates the video/audio synchronization process. Steps S102 and S103 may be performed in parallel. Likewise, steps S104, S105, and S106 may be performed in parallel.

As described above, if there is a displacement between the playback time of the video data and the playback time of the audio signal, the video/audio synchronization apparatus corrects the displacement between the playback time of the video data and the playback time of the audio signal by utilizing a silent period in the audio signal. The audio signal can be skipped or repeated in units of time shorter than one frame interval of the video data. As a result, the video/audio synchronization apparatus can adjust the playback time of the audio signal so that the displacement between the playback time of the video data and the playback time of the audio signal becomes shorter than one frame interval. Furthermore, since the video/audio synchronization apparatus adjusts the playback time of the audio signal by utilizing a silent period, the playback time of the audio signal can be adjusted without the viewer/listener noticing it.

According to a modified example, if the absolute value of the delay time of the video data frame is equal to or greater than the predetermined threshold value, the audio timing adjusting unit 15 may adjust the delay time of the associated audio signal to a predetermined value by skipping or repeating the silent period of the associated audio signal.

Figure 4:
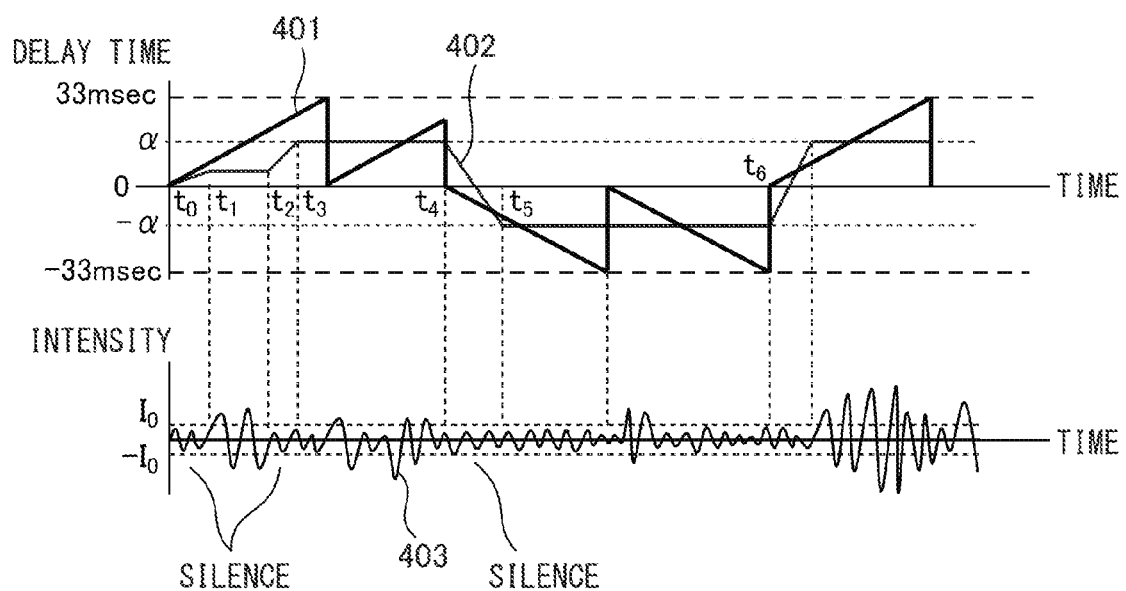
FIG. 4 is a timing chart illustrating one example of the relationship between the delay time of video data relative to a reference playback time, the delay time of an audio signal relative to a reference playback time, and the strength of the audio signal according to a modified example.

FIG. 4 is a timing chart illustrating one example of the relationship between the delay time of the video data, the delay time of the audio signal relative to the reference playback time, and the strength of the audio signal according to the modified example. In FIG. 4, the abscissa represents the time. In the upper chart, the ordinate represents the delay time. When the delay time is above 0, the playback time of the video data frame is earlier than the reference playback time. On the other hand, when the delay time is below 0, the playback time of the video data frame is later than the reference playback time. In the lower chart, the ordinate represents the sound intensity. In the illustrated example, it is assumed that the frame interval of the video data is 33 msec.

Waveform 401 depicts how the delay time of the video data changes over time. Waveform 402 depicts the delay time of the audio data relative to the reference playback time of the audio data, while waveform 403 depicts how the strength of the audio signal changes over time.

As depicted by waveform 401, when the delay time of the video data reaches +33 msec, one frame is repeated and the delay time is reset to 0. Conversely, when the delay time of the video data reaches −33 msec, one frame is skipped, and the delay time is likewise reset to 0. When the playback time of the video data is earlier than the reference playback time, as in the period from $t_0$ to $t_4$, the silent period is skipped until the delay time of the associated audio signal becomes equal to a predetermined time $\alpha$. In the illustrated example, since the silent periods of the audio signal appear from time $t_0$ to $t_1$ and from $t_2$ to $t_3$, the silent periods from time $t_0$ to $t_1$ and from $t_2$ to $t_3$ are skipped. Then, during the period when the playback time of the video data is earlier than the reference playback time, the delay time of the audio data is held at the predetermined time $\alpha$.

On the other hand, when the playback time of the video data is later than the reference playback time, as in the period from $t_4$ to $t_6$, the silent period $t_4$ to $t_5$ within the period $t_4$ to $t_6$ is repeated, and the delay time of the audio data is set to a predetermined time ($-\alpha$). The predetermined time $\alpha$ can be set shorter in length than one frame interval of the video data, for example, equal in length to one half the frame interval, or can be set equal to the mean, median, or mode of the absolute values of the delay times of a predetermined number of past frames of the video data. By setting the predetermined time $\alpha$ as described above, the audio timing adjusting unit 15 can reduce the difference between the delay time of each frame and the delay time of its associated audio signal, i.e. the difference between the playback time of each frame and the playback time of its associated audio signal, to less than one frame interval.

Figure 5:
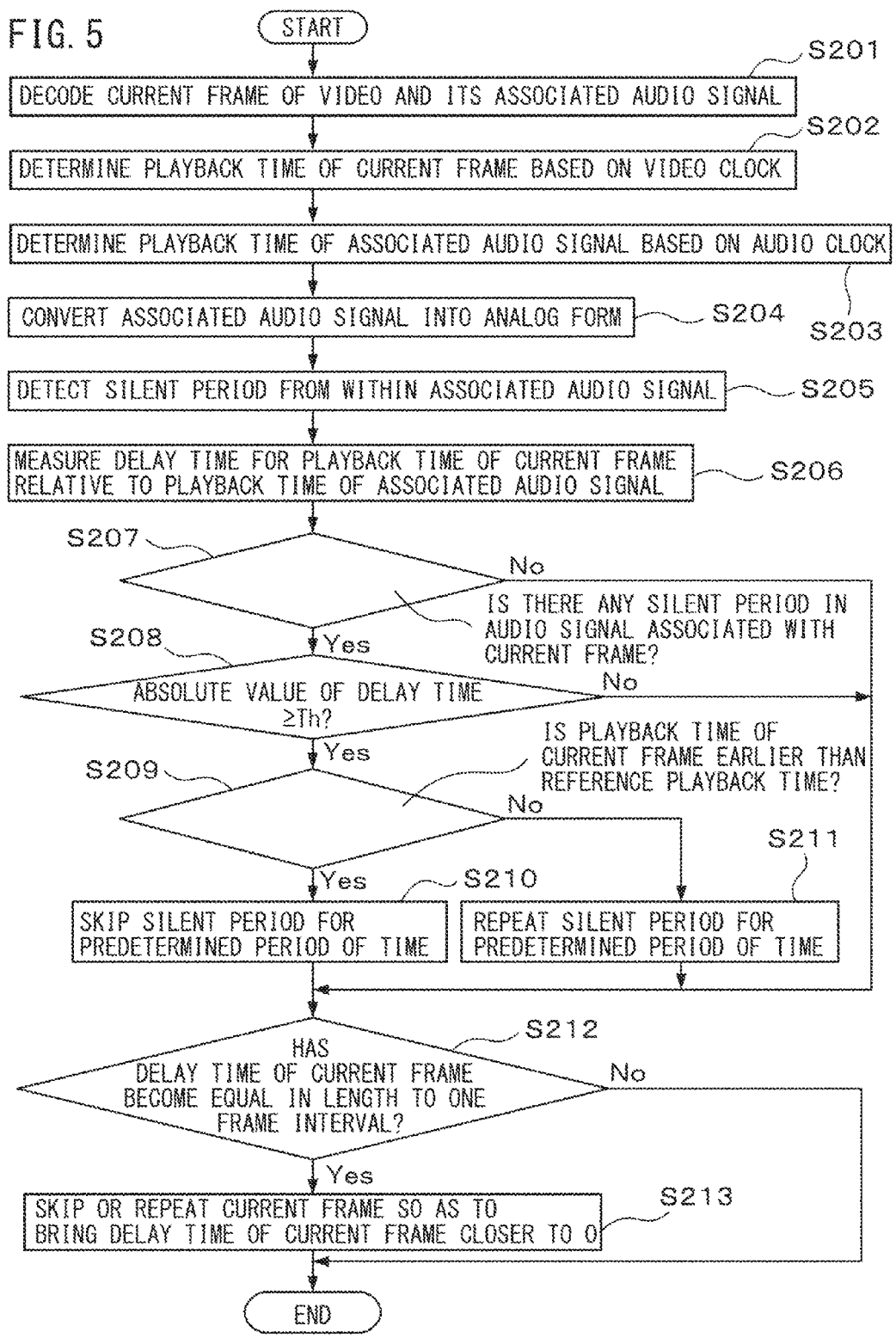
FIG. 5 is an operation flowchart of a video/audio synchronization process according to the modified example.

FIG. 5 is an operation flowchart of a video/audio synchronization process according to the modified embodiment. The video/audio synchronization apparatus 1 repeats the following process for each frame of the video data. In FIG. 5, steps S201 to S206, S212, and S213 are the same as the corresponding steps S101 to S106, S109, and S110 in the operation flowchart of FIG. 3. Therefore, a description of steps S201 to S206, S212, and S213 will be omitted herein.

After step S206, the audio timing adjusting unit 15 determines whether there is a silent period in the audio signal associated with the current frame (step S207). If there is a silent period (Yes in step S207), the audio timing adjusting unit 15 then determines whether the absolute value of the delay time is either equal to or greater than a predetermined threshold value Th (step S208). The predetermined threshold value Th can be set smaller in value than one frame interval period, for example, equal in value to the adjustment unit period. If the absolute value of the delay time is equal to or greater than the threshold value Th (Yes in step S208), then by referring to the delay time, the audio timing adjusting unit 15 determines whether the playback time of the frame is earlier than the reference playback time (step S209).

If the delay time indicates that the playback time of the frame is earlier than the reference playback time (Yes in step S209), the audio timing adjusting unit 15 skips the silent period for a predetermined period of time (step S210). On the other hand, if the delay time indicates that the playback time of the frame is later than the reference playback time (No in step S209), the audio timing adjusting unit 15 repeats the silent period for a predetermined period of time (step S211).

After step S210 or S211, or if there is no silent period in step S207 (No in step S207), the video/audio synchronization apparatus 1 proceeds to step S212 so as to carry out the remainder of the process. Further, if the absolute value of the delay time is smaller than the threshold value Th in step S208 (No in step S208), the video/audio synchronization apparatus 1 also proceeds to step S212 so as to carry out the remainder of the process. Thereafter, the video/audio synchronization apparatus 1 terminates the video/audio synchronization process.

Since the video/audio synchronization apparatus according to the above modified example can simplify the control for adjusting the playback time of the audio data while at the same time achieving the same effect as the foregoing embodiment, the amount of computation to be performed by the audio timing adjusting unit 15 can be reduced.

In the above embodiment or modified example, detection of a silent period and the repeating or skipping of a silent period are performed based on the analog audio signal. However, the video/audio synchronization apparatus may detect a silent period and repeat or skip a silent period, based on the digital audio signal. Then, the video/audio synchronization apparatus may convert the digital audio signal into analog form after adjusting its playback time by repeating or skipping a silent period.

Figure 6:
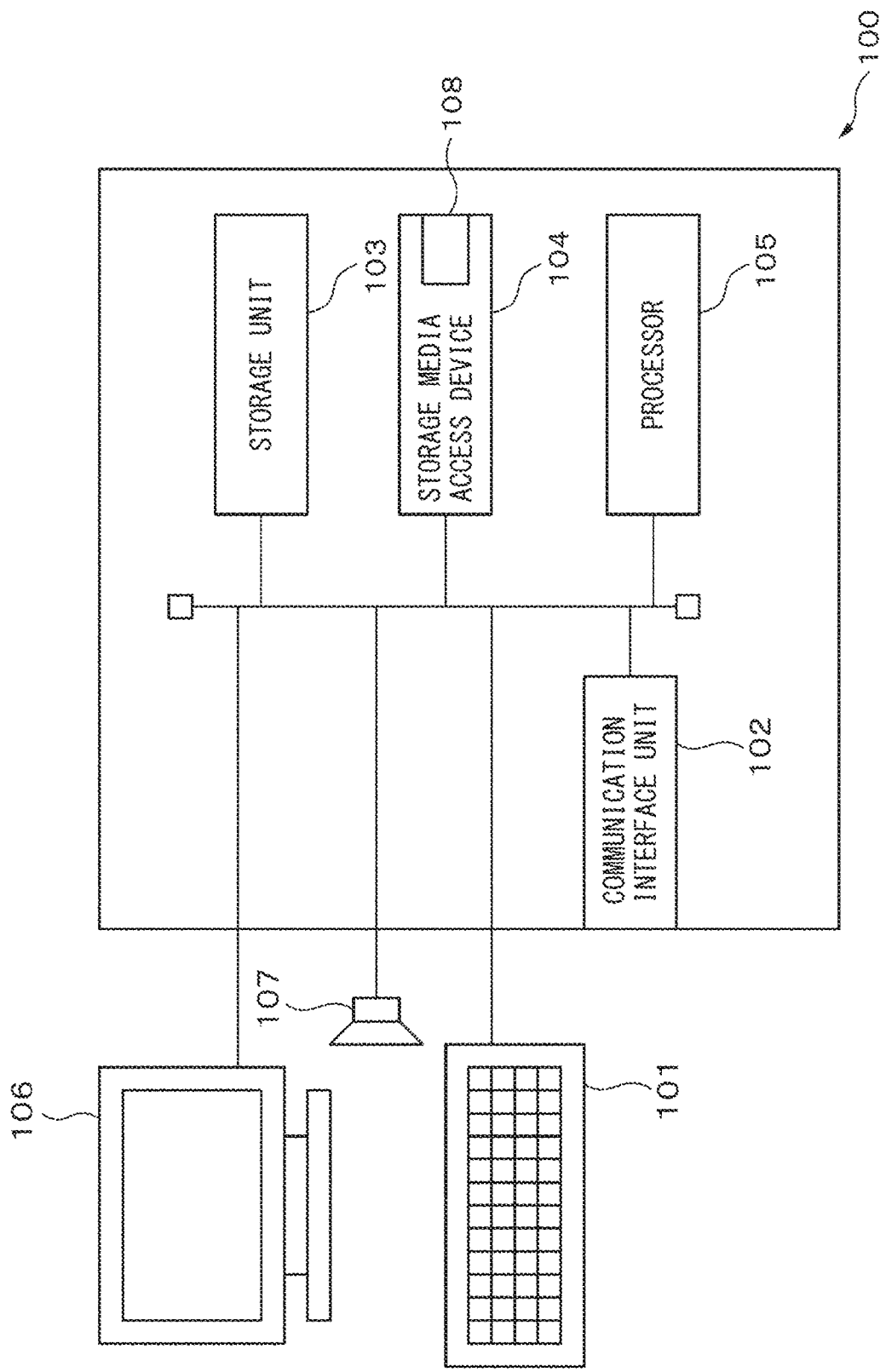
FIG. 6 is a diagram schematically illustrating the configuration of a computer for implementing the video/audio synchronization process according to the embodiment or a modified example thereof.

FIG. 6 is a diagram illustrating the configuration of a computer which operates as the video/audio synchronization apparatus by executing a computer program for implementing the functions of the various units constituting the video/audio synchronization apparatus according to the above embodiment or its modified example.

The computer 100 includes a user interface unit 101, a communication interface unit 102, a storage unit 103, a storage media access device 104, a processor 105, a display device 106, and a speaker 107. The processor 105 is connected to the user interface unit 101, communication interface unit 102, storage unit 103, and storage media access device 104, for example, via a bus. The processor 105 is also connected to the display device 106 via a video interface (not depicted) and to the speaker 107 via an audio interface (not depicted).

The user interface unit 101 includes, for example, an input device such as a keyboard and a mouse. Alternatively, the user interface unit 101 may include a device such as a touch panel display, in which an input device and a display device are integrated. The user interface unit 101 generates, for example, in response to a user operation, an operation signal for selecting the video data and audio data to be decoded, and supplies the operation signal to the processor 105.

The communication interface unit 102 may include a communication interface for connecting to a communication network conforming to a communication standard such as the Ethernet (registered trademark), and a control circuit for the communication interface. The communication interface unit 102 acquires encoded video data and audio data from another apparatus connected to the communication network, and passes the data to the processor 105.

The storage unit 103 includes, for example, a readable/writable semiconductor memory and a read-only semiconductor memory, and stores a computer program for implementing the video/audio synchronization process to be executed on the processor 105, and also stores data generated as a result of or during the execution of the program.

The storage media access device 104 is a device which accesses a storage medium 108 such as a magnetic disk, a semiconductor memory card, or an optical storage medium. The storage media access device 104 accesses the storage medium 108 to read out, for example, the computer program for implementing the video/audio synchronization process to be executed on the processor 105, and passes the computer program to the processor 105.

The processor 105 performs the video/audio synchronization process on the encoded video data and audio data by executing the computer program for implementing the video/audio synchronization process according to the above embodiment or its modified example. Then, the processor 105 outputs the decoded video data to the display device 106 and the decoded analog audio data to the speaker 107.

The computer program to be executed on the computer to implement the functions of the various units constituting the video/audio synchronization apparatus may be provided in a form stored in a semiconductor memory or in a form recorded on a recording medium such as an optical recording medium. The term "recording medium" here does not include a carrier wave.

The video/audio synchronization apparatus according to the above embodiment or its modified example can be used in various applications. For example, the video/audio synchronization apparatus can be incorporated in a video receiving apparatus, a video telephone system, a computer, or a mobile telephone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiment of the present invention has been described in detail, it should be understood that the various changes, substitutions, and alterations can be made hereto without departing from the spirit and scope of the invention.

What is claimed is:

1. A video/audio synchronization apparatus comprising:
   a decoder configured to decode a frame contained in encoded video data and determine playback time of the frame based on a first clock signal, and decode encoded audio data and determine playback time of an associated audio signal contained in the decoded audio data and to be played back simultaneously with the frame, based on a second clock signal different from the first clock signal;

a silent period detector configured to detect a silent period from within the associated audio signal;

a delay time measure configured to measure a delay time representing how much the playback time of the associated audio signal determined based on the second clock signal is delayed with respect to the playback time of the frame determined based on the first clock signal; and an audio timing adjuster configured to reduce a difference between the playback time of the frame and the playback time of the associated audio signal by skipping a silent period contained within a period of the associated audio signal when the delay time indicates that the playback time of the associated audio signal is later than the playback time of the frame, while by repeating the silent period when the delay time indicates that the playback time of the associated audio signal is earlier than the playback time of the frame.

2. The video/audio synchronization apparatus according to claim 1, wherein:

the audio timing adjuster skips or repeats the silent period, depending on the delay time, until the delay time becomes shorter in length than a predetermined period or until there is no longer the silent period that can be skipped.

3. The video/audio synchronization apparatus according to claim 2, wherein the predetermined period defines a minimum interval during which a silent period is to be skipped or repeated.

4. The video/audio synchronization apparatus according to claim 1, wherein:

when the delay time indicates that the playback time of the associated audio signal is later than the playback time of the frame by an amount equal to or greater than a predetermined threshold value, the audio timing adjuster skips the silent period over a predetermined length of time shorter than an interval between two successive frames, and when the delay time indicates that the playback time of the associated audio signal is earlier than the playback time of the frame by an amount equal to or greater than the predetermined threshold value, the audio timing adjuster repeats the silent period over the predetermined length of time.

5. A video/audio synchronization method comprising:

decoding a frame contained in encoded video data and determining playback time of the frame based on a first clock signal;

decoding encoded audio data and determining playback time of an associated audio signal contained in the decoded audio data and to be played back simultaneously with the frame, based on a second clock signal different from the first clock signal;

detecting a silent period from within the associated audio signal;

measuring a delay time representing how much the playback time of the associated audio signal determined based on the second clock signal is delayed with respect to the playback time of the frame determined based on the first clock signal; and reducing a difference between the playback time of the frame and the playback time of the associated audio signal by skipping a silent period contained within a period of the associated audio signal when the delay time indicates that the playback time of the associated audio signal is later than the playback time of the frame, while by repeating the silent period when the delay time indicates that the playback time of the associated audio signal is earlier than the playback time of the frame.

6. The video/audio synchronization method according to claim 5, wherein:

the reducing the difference between the playback time of the frame and the playback time of the associated audio signal skips or repeats the silent period, depending on the delay time, until the delay time becomes shorter in length than a predetermined period or until there is no longer the silent period that can be skipped.

7. The video/audio synchronization method according to claim 6, wherein the predetermined period defines a minimum interval during which a silent period is to be skipped or repeated.

8. The video/audio synchronization method according to claim 5, wherein:

when the delay time indicates that the playback time of the associated audio signal is later than the playback time of the frame by an amount equal to or greater than a predetermined threshold value, the reducing the difference between the playback time of the frame and the playback time of the associated audio signal skips the silent period over a predetermined length of time shorter than an interval between two successive frames, and when the delay time indicates that the playback time of the associated audio signal is earlier than the playback time of the frame by an amount equal to or greater than the predetermined threshold value, the reducing the difference between the playback time of the frame and the playback time of the associated audio signal repeats the silent period over the predetermined length of time.

9. A non-transitory computer-readable recording medium having recorded thereon a computer program for video/audio synchronization that causes a computer to execute a process comprising:

decoding a frame contained in encoded video data and determining playback time of the frame based on a first clock signal;

decoding encoded audio data and determining playback time of an associated audio signal contained in the decoded audio data and to be played back simultaneously with the frame, based on a second clock signal different from the first clock signal;

detecting a silent period from within the associated audio signal;

measuring a delay time representing how much the playback time of the associated audio signal determined based on the second clock signal is delayed with respect to the playback time of the frame determined based on the first clock signal; and reducing a difference between the playback time of the frame and the playback time of the associated audio signal by skipping a silent period contained within a period of the associated audio signal when the delay time indicates that the playback time of the associated audio signal is later than the playback time of the frame, while by repeating the silent period when the delay time indicates that the playback time of the associated audio signal is earlier than the playback time of the frame.

* * * * *